United States Patent Office 3,763,199
Patented Oct. 2, 1973

3,763,199
PROCESS FOR PREPARING ZINC 2-BENZAMIDO-
THIOPHENATE
George Louis Mina, High Bridge, N.J., assignor to
American Cyanamid Company, Stamford, Conn.
No Drawing. Filed Nov. 18, 1971, Ser. No. 200,206
Int. Cl. C07f 3/06
U.S. Cl. 260—429.9                                    9 Claims

ABSTRACT OF THE DISCLOSURE

An improved process for preparing zinc 2-benzamido-thiophenate which involves the direct benzoylation of 2-aminothiophenol.

Generally stated, the subject matter of the present invention relates to an improved process for preparing zinc 2-benzamidothiophenate, a plasticizing and peptizing agent for natural and synthetic rubber stocks. More particularly, the invention relates to an improved process for preparing zinc 2-benzamidothiophenate which involves the direct benzoylation of 2-aminothiophenol.

BACKGROUND OF THE INVENTION

Natural rubber which is usually available in the form of heavy sheets, must be fluidized by milling before any processing can be accomplished. Plasticizers are employed in the milling process to accelerate the fluidizing and thereby provide shorter milling times. Of all the plasticizers available zinc 2-benzamidothiophenate is recognized as one of the most effective plasticizers for this purpose. The process for preparing this compound is complicated and time consuming. In essence, the process entails hydrolyzing benzothiozole to sodium 2-aminothiophenate which in turn is oxidized to di-2-aminodiphenyl-disulfide. The di-2-aminodiphenyldisulfide is then benzoylated to di-2-benzamidodiphenyldisulfide. This compound is then reduced to sodium 2-benzoamidothiophenate and converted to zinc 2-benzamidothiophenate with zinc chloride. This process is shown schematically as follows:

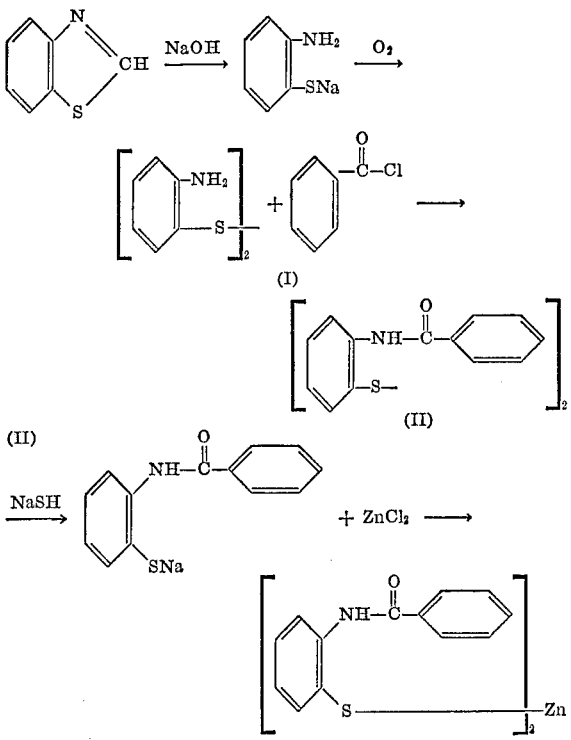

The necessity for oxidizing the sodium 2-aminothiophenate to di-2-aminodiphenyl disulfide prior to benzoylation is to avoid the formation of the following N,S-dibenzoylated compound:

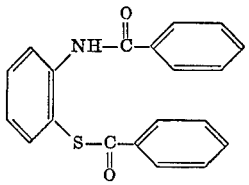

This compound is produced in large amounts since the sulfur anion in sodium 2-aminothiophenate has a greater affinity for reaction with the benzoyl chloride than the amino group. Therefore, the oxidation and reduction steps are necessary in the manufacture of zinc 2-benzamidothiophenate and thereby materially increase the cost of production.

The present invention represents the culmination of a long series of investigations directed to improving the process for preparing zinc 2-benzamidothiophenate.

Accordingly, it is an object of this invention to provide an improved process for preparing zinc 2-benzamidothiophenate.

An additional object of the invention is to provide a process for preparing zinc 2-benzamidothiophenate which is substantially cheaper, as well as simpler than the prior art process.

All previous attempts to produce zinc 2-benzamidothiophenate by direct benzoylation were unsuccessful resulting in yields of approximately 10%, thereby indicating that the reaction afforded primarily N,S-dibenzoyl aminothiophenol at a high pH and phenyl benzothiozole at a low pH with concomitant oxidation to di-2-benzamidodiphenyldisulfide. These results were recently confirmed by A. Ito, Yakugaku Zasshi, 82, pp. 866–883.

Additional objects and advantages will be set forth in part in the description which follows and in part will be obvious from the description or may be learned by the practice of the invention, the objects and advantages being realized and attained by means of the processes and improvements, particularly pointed out in the appended claims.

THE INVENTION

To achieve the foregoing objects and in accordance with its purposes as embodied and broadly described, the present invention provides a process for preparing zinc 2-benzamidothiophenate which comprises reacting a solution of 2-aminothiophenol dissolved in an inert water-immiscible organic solvent which is in intimate contact with an aqueous solution of an acid acceptor, with essentially a stoichiometric amount of benzoyl chloride. Separating the organic phase from the aqueous phase, which aqueous phase is heated to a temperature of from about 50 to 60° C. for a sufficient period of time to convert minor amounts of N,S-dibenzoylaminothiophenol to N-benzamidothiophenol. The organic solvent solution is then cooled and extracted with an aqueous solution of sodium hydroxide. This solution comprising sodium 2-benzamidothiophenate is reacted with zinc chloride and zinc 2-benzamidothiophenate is recovered from the reacton mixture by filtration.

The invention consists of the novel methods, processes, steps and improvements herein shown and described.

It is to be understood that both the foregoing general description and the following detailed description are exemplary and explanatory and are not restrictive of the invention.

In essence, applicant has discovered that N-benzoyl-aminothiophenol can be obtained by the direct benzoylation of 2-aminothiophenol with an essentially stoichiometric amount of benzoyl chloride, using a hydrochloric acid acceptor, followed by heating at a temperature of from about 50 to 60° C. so as to convert small amounts of the dibenzoylated aminothiophenol byproduct to N-benzoylaminothiophenol which is then converted to zinc 2-benzamidothiophenate by reaction with zinc chloride.

In accordance with the present invention the benzoylation is carried out on 2-aminothiophenol and not on its sodium salt, since the sulfur anion has a greater reaction affinity with benzoyl chloride than the amino group.

Benzoylation is conducted in a two-phase system consisting of an inert, water-immiscible solvent, such as toluene, xylene and the like in which the aminothiophenol is dissolved and an aqueous solution of an acid acceptor, preferably sodium or potassium dicarbonate, an intimate contact in an inert atmosphere.

The use of sodium or potassium bicarbonate as the acid acceptor is preferred since they do not form sodium salt of aminothiophenol which encourages S-benzoylation. However, the use of other commonly used acid acceptors, such as sodium or potassium carbonate is permissible. The acid acceptor is used in an amount of up to about a 20% excess of that required to neutralize the evolved hydrochloric acid.

In addition, an inert atmosphere is considered desirable to prevent oxidation of the aminothiophenol to the disulfide, that is di-2-benzamidodiphenyldisulfide during the reaction. The most commonly used and preferred atmosphere is a nitrogen atmosphere.

Intimate contact between the organic and aqueous phase is important to promote rapid transfer of the evolved hydrochloric acid to the aqueous phase and thereby prevent an acid catalyzed cyclization to an undesirable by-product, phenyl benzothiazole.

It should be noted that even under the more ideal conditions, small amounts of N,S-dibenzoylaminothiophenol are formed during the reaction. Thus, following the benzoylation reaction the aqueous phase is withdrawn from the organic phase containing N-benzoylaminothiophenol and N,S-dibenzoylaminothiophenol and the organic phase is heated at a temperature of from about 50 to 60° C., sufficient to convert N,S-dibenzoylaminothiophenol to N-benzoylaminothiophenol, usually from 1 to 2 hours. This conversion is a particularly novel feature of the present invention, since during the reaction an essentially stoichiometric amount of benzoyl chloride is reacted with the aminothiophenol, thereby, leaving a small excess of aminothiophenol on completion of the reaction. Some of the benzoyl chloride forms the dibenzoylated product. The N,S-dibenzoylaminothiophenol is heated in the presence of aminothiophenol to convert such benzoylated compound to N-benzoylaminothiophenol. Schematically illustrated as follows:

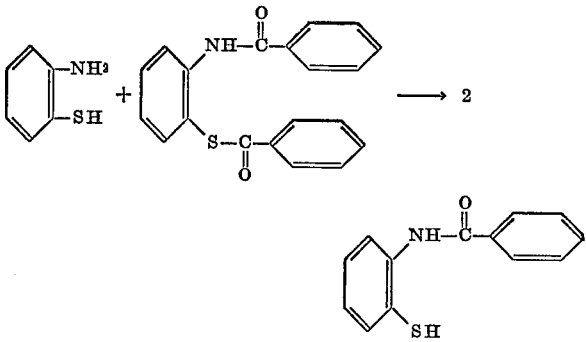

Following conversion of the N,S-dibenzoylaminothiophenol to N-benzoylaminothiophenol, an aqueous solution of sodium hydroxide is added to the organic phase in an amount sufficient to convert the product to its sodium salt. The organic phase is then separated from the aqueous phase which contains a solution of the sodium 2-benzamidothiophenate. This solution in turn is reacted with an aqueous solution of zinc chloride at a pH of about 9 to 10 resulting in zinc 2-benzamidothiophenate.

The following example is provided for illustrative purposes and may include particular features of the invention. However, the example should not be construed as limiting the invention, many variations of which are possible without departing from the spirit or scope thereof.

EXAMPLE

Toluene, 150 gallons, is charged to a 300 gallon reaction kettle. To this is charged 156 pounds, real aminothiophenol, of an aqueous solution of 2-aminothiophenate. Nitrogen flow started and agitation set at 90 r.p.m. Actic acid, 100 pounds, is then added and the mixture is stirred for about 15 minutes, the agitator is then stopped and the pH of the aqueous phase measured to insure complete neutralization of the sodium salt. Correction is made at this point if necessary. Agitation is again started and 125 pounds of sodium bicarbonate is carefully added in 10 pound portions. Benzoyl chloride, 175 pounds, is charged to an appropriate addition vessel. Vacuum is applied to the reaction vessel, which is vented with nitrogen, and the benzoyl chloride is added at a rate requiring 1.5–2 hours. When addition is complete, the reaction mixture is stirred for 1 hour and agitation stopped. The lower aqueous phase is withdrawn and the temperature of the organic phase is adjusted to 50–55° C. and maintained at no higher than 60° C. for about 1 hour. The temperature is then lowered to 35° C., and 55 gallons of water is added. Sodium hydroxide, 100 pounds of 50 percent, is added and the mixture is agitated for 30 minutes. Agitation is then stopped, and the aqueous layer containing sodium 2-benzamidothiophenate is discharged. A total of 828 pounds of solution was obtained.

A 300 gallon kettle is charged with 20 gallons of water, 0.5 pound of an ethanolated alkylguanidine amine complex, and 1 pound of medium processing oil. To a separate tank is added 16.5 pounds of zinc chloride, real, as a 10 percent solution, which is then diluted with 20 gallons of water.

To the 300 gallon kettle is added 128 pounds of the sodium 2-benzamidothiophenate solution. This solution is diluted with 35 gallons of water. The pH is adjusted to 9–10 with hydrochloric acid. The zinc chloride solution is added over an hour to the agitated sodium 2-benzamidothiophenate solution. A thick white slurry is formed to which 65 gallons of water is added. The slurry is heated to 70° C. and filtered. The white solid product is washed with water and dried. A yield of 45.7 pounds was obtained, 90 percent as is basis.

What is claimed is:

1. A process for preparing zinc 2-benzamidothiophenate which comprises:
    (a) reacting in an inert atmosphere 2-aminothiophenol dissolved in an inert, water-immiscible organic solvent with a stoichiometric amount of benzoyl chloride, said organic solvent being in intimate contact with an aqueous solution of an acid acceptor;
    (b) separating the organic phase from the aqueous phase and heating said organic phase at a temperature of from about 50 to 60° C. for a period of time sufficient to convert minor amounts of N,S-dibenzoylaminothiophenol to N-benzamidothiophenol;
    (c) cooling said organic phase and adding sodium hydroxide solution to said phase in an amount sufficient to convert N-benzamidothiophenol to its sodium salt;
    (d) reacting the aqueous solution of sodium 2-benzamidothiophenate resulting from step (c) with a stoichiometric amount of zinc chloride; and
    (e) recovering zinc 2-benzamidothiophenate from the reaction mixture by filtration.

2. A process according to claim 1 wherein the inert atmosphere is nitrogen.

3. A process according to claim 1 wherein the inert, water-immiscible organic solvent is toluene.

4. A process according to claim 1 wherein the inert, water-immiscible solvent is xylene.

5. A process according to claim 1 wherein the acid acceptor is sodium bicarbonate.

6. A process according to claim 1 wherein the acid acceptor is potassium bicarbonate.

7. A process according to claim 1 wherein the acid acceptor is sodium carbonate.

8. A process according to claim 1 wherein the acid acceptor is potassium carbonate.

9. A process according to claim 1 wherein the acid acceptor is present in an amount of up to about 20 percent in excess of that required to neutralize the hydrochloric acid resulting from the reaction.

References Cited
UNITED STATES PATENTS

| 2,480,342 | 8/1949 | Steiger et al. | 260—429.9 |
| 2,787,621 | 4/1957 | Hook et al. | 260—429.9 X |

OTHER REFERENCES

Chemical Abstracts, vol. 58, 484a (1963).
Chemical Abstracts, vol. 55, 1589h (1961).
Chemical Abstracts, vol. 55, 24067d (1961).
Chemical Abstracts, vol. 60, 15684h–15685a (1964).
Chemical Abstracts, vol. 58, 6732g (1963).

HELEN M. S. SNEED, Primary Examiner

UNITED STATES PATENT OFFICE
CERTIFICATE OF CORRECTION

Patent No. 3,763,199  Dated October 2, 1973

Inventor(s) George Louis Mina

It is certified that error appears in the above-identified patent and that said Letters Patent are hereby corrected as shown below:

Column 3, line 16: "dicarbonate" should read -- bicarbonate --.

Signed and sealed this 15th day of January 1974.

(SEAL)
Attest:

EDWARD M. FLETCHER, JR.        RENE D. TEGTMEYER
Attesting Officer              Acting Commissioner of Patents